United States Patent
Miu et al.

(10) Patent No.: US 11,093,770 B2
(45) Date of Patent: Aug. 17, 2021

(54) SYSTEM AND METHOD FOR LIVENESS DETECTION

(71) Applicant: Idemia Identity & Security USA LLC, Billerica, MA (US)

(72) Inventors: Stephen Miu, Chelmsford, MA (US); Yecheng Wu, Lexington, MA (US)

(73) Assignee: Idemia Identity & Security USA LLC, Billerica, MA (US)

( * ) Notice: Subject to any disclaimer, the term of this patent is extended or adjusted under 35 U.S.C. 154(b) by 118 days.

(21) Appl. No.: 16/236,917

(22) Filed: Dec. 31, 2018

(65) Prior Publication Data

US 2019/0205680 A1 Jul. 4, 2019

Related U.S. Application Data

(60) Provisional application No. 62/612,071, filed on Dec. 29, 2017.

(51) Int. Cl.
| | |
|---|---|
| *G06K 9/00* | (2006.01) |
| *G07C 9/00* | (2020.01) |
| *G06Q 20/40* | (2012.01) |
| *G06Q 50/26* | (2012.01) |

(Continued)

(52) U.S. Cl.
CPC ..... *G06K 9/00906* (2013.01); *G06K 9/00255* (2013.01); *G06K 9/00268* (2013.01); *G06K 9/00288* (2013.01); *G06K 9/00718* (2013.01); *G07C 9/00* (2013.01);

(Continued)

(58) Field of Classification Search
CPC ........... G06K 9/00906; G06K 9/00255; G06K 9/00268; G06K 9/00288; G06K 9/00718; G07C 9/00
See application file for complete search history.

(56) References Cited

U.S. PATENT DOCUMENTS

| | | |
|---|---|---|
| 8,457,367 B1 | 6/2013 | Sipe |
| 8,542,879 B1 | 9/2013 | Nechyba |
| 8,582,835 B2 | 11/2013 | Cavallini |

(Continued)

OTHER PUBLICATIONS

PCT International Search Report in International Application No. PCT/US18/68213, dated Apr. 12, 2019, 8 pages.

(Continued)

*Primary Examiner* — Mia M Thomas
(74) *Attorney, Agent, or Firm* — Fish & Richardson P.C.

(57) ABSTRACT

Methods, systems, and apparatus, including computer programs encoded on a computer storage medium, for liveness detection are disclosed. In one aspect, a method includes the actions of capturing video data that includes multiple video frames that each include a representation of a face of a user while activating multiple light sources according to a predetermined lighting pattern. The actions further include, for each of the multiple video frames that each include the representation of the face of the user, analyzing the representation of the face of the user in the respective video frame and the respective predetermined lighting pattern active during capture of the respective video frame. The actions further include, based on analyzing the representation of the face of the user in the respective video frame and the respective predetermined lighting pattern, determining whether the face of the user is that of a live person or a static image.

20 Claims, 7 Drawing Sheets

(51) Int. Cl.
*G07C 9/26* (2020.01)
*G07C 9/25* (2020.01)

(52) U.S. Cl.
CPC ..... *G06Q 20/40145* (2013.01); *G06Q 50/265* (2013.01); *G07C 9/257* (2020.01); *G07C 9/26* (2020.01)

(56) References Cited

U.S. PATENT DOCUMENTS

| | | | |
|---|---|---|---|
| 8,798,336 B2 | 8/2014 | Nechyba et al. | |
| 8,848,986 B2 | 9/2014 | Cavallini | |
| 9,076,030 B2 | 7/2015 | Cavallini | |
| 9,202,121 B2 | 12/2015 | Cavallini | |
| 9,489,102 B2* | 11/2016 | Samadani | G06F 3/048 |
| 9,652,892 B2* | 5/2017 | Tomlin | G02B 27/017 |
| 10,268,911 B1 | 4/2019 | Wu | |
| 2010/0299530 A1* | 11/2010 | Bell | G06F 21/32 713/186 |
| 2013/0016882 A1 | 1/2013 | Cavallini | |
| 2013/0188840 A1* | 7/2013 | Ma | G06K 9/00261 382/107 |
| 2014/0016837 A1* | 1/2014 | Nechyba | G06K 9/00221 382/118 |
| 2014/0270412 A1* | 9/2014 | Ma | G06K 9/00221 382/118 |
| 2015/0104081 A1* | 4/2015 | Ionita | G06T 7/60 382/117 |
| 2015/0169943 A1 | 6/2015 | Khitrov | |
| 2016/0063314 A1* | 3/2016 | Samet | G06K 9/00268 348/78 |
| 2016/0205096 A1 | 7/2016 | Hoyos et al. | |
| 2017/0053174 A1 | 2/2017 | Fan et al. | |
| 2017/0180348 A1* | 6/2017 | Piccolotto | G06K 9/00355 |
| 2017/0193285 A1 | 7/2017 | Negi et al. | |

OTHER PUBLICATIONS

PCT International Preliminary Report on Patentability and Written Opinion in International Application No. PCT/US2018/068213, dated Jul. 9, 2020, 5 pages.

* cited by examiner

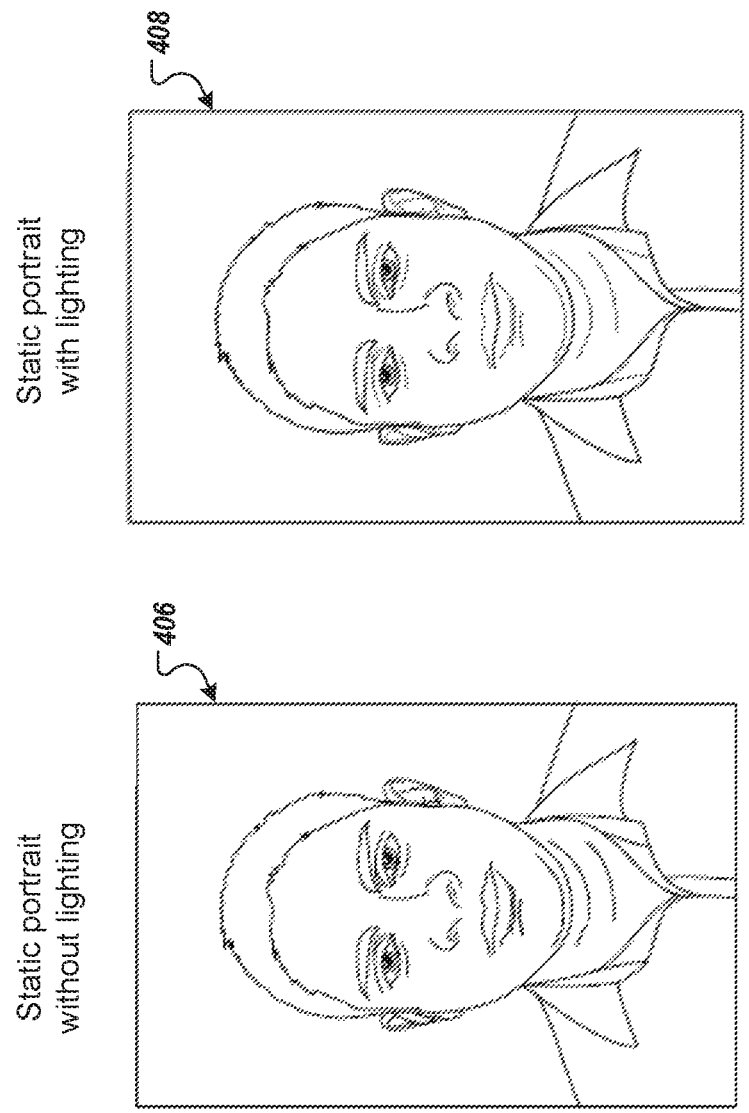

SYSTEM AND METHOD FOR LIVENESS DETECTION

CROSS-REFERENCE TO RELATED APPLICATION

This application claims the benefit of U.S. Application No. 62/612,071, filed Dec. 29, 2017, the contents of which are incorporated by reference.

TECHNICAL FIELD

This document generally relates to the verification of identities.

BACKGROUND

Identities asserted in an on-line context are subject to risks of identity theft, identity fraud, spoofing, phishing, etc., all of which may potentially hinder the flow of commerce.

SUMMARY

Proof of identity may present a perennial challenge in our daily transactions. With the advent of the Internet, comes the age of e-commerce in which on-line transactions may replace in-person transactions. However, the sheer volume and complexity of these on-line transactions may give rise to a digital world fraught with peril, including, for example, identity theft, identity fraud, spoofing, phishing, etc. Notably, such risks may not be new in the Internet age, although the Internet may have amplified such risks. As the society moves towards cloud computing, more and more databases may become accessible. As connectivity becomes ubiquitous and as more visualization angles become available on accessible user platforms, facial landmarks can be analyzed and correlated. In addition, biometric data such as facial portrait data submitted on-line can be verified for liveness to deter or thwart spoofing attempts. In some implementations, the liveness verification can be conducted by leveraging the three-dimensional nature of facial landmarks in a facial portrait as well as variations in lighting patterns. Implementations disclosed herein may be extended to enterprise entities as well as financial institutions.

Some illustrative implementations may leverage the video processing capabilities on a mobile device, which may be synchronized or integrated with lighting capabilities. For example, the mobile device of a user may include a camera device. When taking a facial portrait of the user, the camera device may initially obtain a sequence of images of the user, for instance, during a scout scan of a selfie. In this example, the mobile device of the user may additionally include lighting components or accessories, such as flash lights. In some implementations, each image frame in the obtained video sequence may be analyzed. Particularly, the face of the subject may be detected in each image frame. Further, the facial features on the face may be detected, including, for example, the forehead, the noise, the eye brows, the iris's, the eye corners, the nostrils, and the cheek. While the stored facial landmarks can be analyzed and face movement may be captured for liveness determination, lighting conditions may be varied to introduce a lighting pattern that can be leveraged to deter spoofing attempts. In this arrangement, not only would the variation of certain facial landmarks between image frames be greater than a predefined threshold level, the lighting patterns between these image frames would also exhibit sufficient differences. In other words, the image frames would encode sufficient features to reflect the three-dimensional facial features taken from a live subject. Otherwise, the images are less likely from a static two-dimensional image or from a static sequence taken earlier, indicating a likely spoofing attempt. In this context, the liveness detection refers to a prudent, and yet stealthy, detection of whether the session is a live one with an active user rather than a third party pretending to be the user simply by using an existing image or video. The detection is performed without indicating to the user that the detection sequence is being performed. Indeed, implementations disclosed herein are not limited to on-line registration or enrollment for identification documents. In some instances, a user may aspire to obtain physical access to a building. A camera device at building entrance may inspect the visitor in a manner that counters spoofing attacks. This feature would be advantageously incorporated by on-campus school buildings, member-only club-houses, condominium or apartment entrances, parking space entrances, hotel rooms, entrance to branch offices of banks after hours. In fact, the feature may be implemented by a gate keeper to effectuate physical access control such that a visitor cannot obtain access by flashing a photo (or biometric record) of an authorized person. The implementations may be extended to access to mobile properties. In one example, the feature can be implemented as an electronic control to lock/unlock the door of a car or vehicle, when a person wishes to enter the car or vehicle.

According to an innovative aspect of the subject matter described in this application, a method for liveness detection includes the actions of capturing, by a computing device, video data that includes multiple video frames that each include a representation of a face of a user while activating multiple light sources according to a predetermined lighting pattern; for each of the multiple video frames that each include the representation of the face of the user, analyzing, by the computing device, the representation of the face of the user in the respective video frame and the respective predetermined lighting pattern active during capture of the respective video frame; and, based on analyzing, for each of the multiple video frames, the representation of the face of the user in the respective video frame and the respective predetermined lighting pattern active during capture of the respective video frame, determining, by the computing device, whether the face of the user is that of a live person or a static image.

These and other implementations can each optionally include one or more of the following features. The action of analyzing the representation of the face of the user in the respective video frame and the respective predetermined lighting pattern active during capture of the respective video frame includes analyzing shadow patterns on each of the respective video frames. The action of determining whether the face of the user is that of a live person or a static image is based on the shadow patterns on each of the respective video frames. The actions further include, based on analyzing shadow patterns on each of the respective video frames, determining that the representation of the face of the user includes shadow patterns that indicate three-dimensional facial features on the representation of the face of the user. The action of determining whether the face of the user is that of a live person or a static image includes determining that the face of the user is that of a live person based on determining that the representation of the face of the user includes shadow patterns that indicate three-dimensional facial features on the representation of the face of the user.

The actions further include, based on analyzing shadow patterns on each of the respective video frames, determining that the representation of the face of the user includes shadow patterns that indicate two-dimensional facial features on the representation of the face of the user. The action of determining whether the face of the user is that of a live person or a static image includes determining that the face of the user is that of a static image based on determining that the representation of the face of the user includes shadow patterns that indicate two-dimensional facial features on the representation of the face of the user. The computing device is a mobile phone. The video data is captured by a front facing camera of the mobile phone. The multiple light sources include multiple LEDs of the mobile phone. The action of determining whether the face of the user is that of a live person or a static image is inconclusive. The actions further include, based on determining whether the face of the user is that of a live person or a static image is inconclusive, capturing, by the computing device, additional video data while activating the multiple light sources according to a different lighting pattern. The predetermined lighting pattern comprises a period of time when each of the multiple light sources are off.

Other implementations of this aspect include corresponding systems, apparatus, and computer programs recorded on computer storage devices, each configured to perform the operations of the methods.

Particular implementations of the subject matter described in this specification can be implemented so as to realize one or more of the following advantages. A system is able to determine whether the representation of a person located in front of a camera is that of a live person. Nefarious actors may try to spoof a system by presenting a photo of a person to gain access to the system as that person.

The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

FIGS. 4A-4D illustrate examples of verifying liveness when authenticating a facial biometric as submitted by a user from a mobile device.

Like reference numbers and designations in the various drawings indicate like elements.

DETAILED DESCRIPTION

Figure 1:
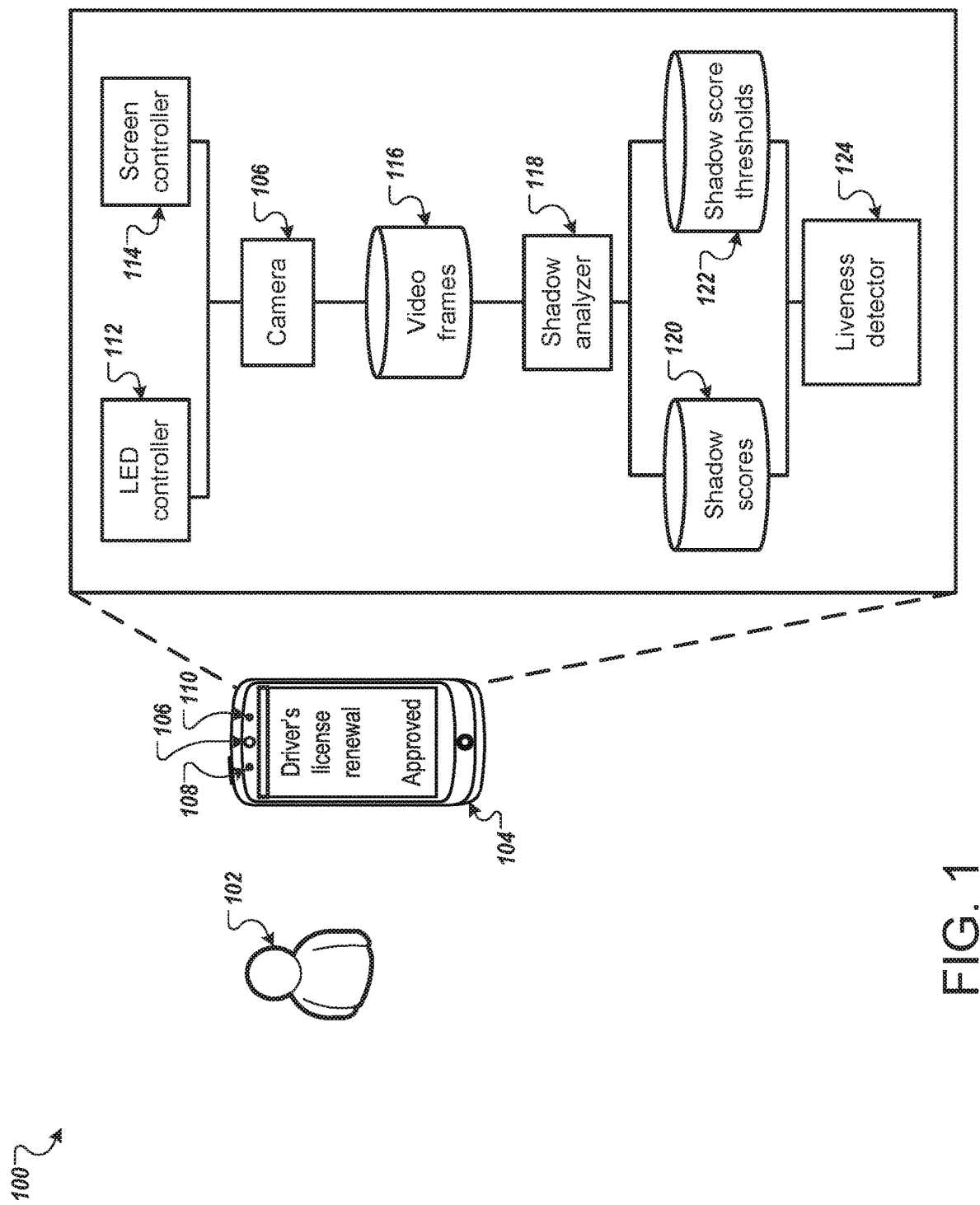
FIG. 1 illustrates an example system for determining liveness

FIG. 1 illustrates an example system 100 for determining liveness. Briefly, and as described in more detail below, the user 102 is using mobile device 104 to renew a driver's license. Typically, the user 102 would have to travel to a government office to renew a driver's license. In this case, the system 100 is able to capture an image of the user 102 for use in creating a new license with the new image of the user 102. In order to maintain the security of the process, the system 100 ensures that the user 102 is actual a live person instead of a picture of the user 102 that another person holds up in front of the mobile device 104.

In more detail, the user 102 accesses a driver's license renewal application on the mobile device 104. The driver's license renewal application may use the mobile device 104 to capture an image of the user 104 for use on the new driver's license. The mobile device 104 includes a camera 106 that can capture an image of the user 102. The mobile device 104 also includes various light sources such as LED 108 and LED 110. In some implementations, the mobile device 104 includes additional light sources such as an indicator light to indicate when the mobile device 104 has a notification for the user 102. The additional light sources may be used in a similar manner to the LED 108 and the LED 110.

In order to protect the security of the driver's license renewal process when the user 102 is not in the physical presence of an agent, the mobile device 104 may capture a video of the user 102 during the enrollment process. The mobile device 104 may capture the video of the user 102 without the user knowing. For example, mobile device 102 may not provide an indication for the user 102 to face the mobile device 104 at any particular time. If the mobile device 104 provided a notification to the user 102, then the security of the process may be compromised as a nefarious user would be able to take additional actions to be able to spoof the system. In this instance, the typically approach that a nefarious user would employ would be to place a photo of the actual user 102 in front of the mobile device 104 to trick the mobile device 104 into determining that the user 102 is present in front of the mobile device. The system 100 is configured to protect against this type of attack.

The mobile device 104 includes an LED controller 112 that is configured to vary the lighting patterns of the light sources of the mobile device 104 including the LED 108 and the LED 110. The LED controller 112 may be configured to activate the LED 108 and the LED 110 at various brightness levels. The LED controller 112 may include several preprogrammed lighting patterns for the LED 108 and the LED 110. In some implementations, the lighting patterns may include periods where the LED 108 and the LED 110 are off.

In some implementations, the mobile device 104 includes a screen controller 114 that is configured to vary the brightness and contents of the display of the mobile device 104. The screen controller 114 may be able to vary the brightness of the entire display or different portions of the display. The screen controller 114 may be able to vary the contents of the entire display or different portions of the display. In the example of renewing a driver's license, the screen controller 114 may control the brightness level of a portion of the display while the remaining portion of the display includes instructions for the user 102. The portion of the display may be blank or may include some type of background image, logo, advertisement, or other type of content that is not directly related to the task of renewing a driver's license. The screen controller 114 may include several preprogrammed patterns for the display. In some implementations, the preprogrammed patterns may include periods where the portion of the display is off or below a threshold level of brightness.

While the user 102 is using the driver's license renewal application, the mobile device 104 uses the camera 106 to capture a video of the user 102 while also using the LED controller 112 to activate the LED 108 and the LED 110 according to a predetermined lighting pattern. In some implementations, the mobile device 104 may also use the screen controller 114 to adjust the brightness level and content of at least a portion of the display during capture of the video.

The mobile device 104 stores the video data in the video frames 116. The video frames 116 may include a representation of the user 102 as the user 102 appears in front of the camera 106. In some implementations, the mobile device 116 may ensure that the video frames 116 includes at least a threshold number of frames before proceeding with analyzing the video frames 116.

The shadow analyzer 118 analyzes the various shadows on each video frame stored in the video frames 116. The shadow analyzer 118 may access data identifying the lighting pattern of the LED 108 and the LED 110 while analyzing the shadows on each video frame. The shadow analyzer 118 may determine the orientation of the user 102 with respect to the LED 108 and the LED 110 based on where the face of the user 102 is located in the video frame and the size of the face of the user 102. Based on orientation of the user 102 and the illumination pattern of the LED 108 and the LED 110, the shadow analyzer 118 may identify areas where shadows are expected to appear on the face of the user 102. The shadow analyzer 118 may compare the video frame with the LED 108 and the LED 110 active to a video frame with the LED 108 and the LED 110 inactive. By comparing the illuminated and unilluminated frame, the shadow analyzer 118 may determine that the shadow pattern of the face of the user 102 is not different. In this case, the shadow analyzer 118 may store a score of 0.1 in the shadow scores 120. If the shadow analyzer 118 compares the illuminated and unilluminated frame, then the shadow analyzer 118 may determine that shadows exist around the eyes of the user 102 and the nose of the user 102. In this case, the shadow analyzer 118 may store a score of 0.9 in the shadow scores 120. A higher score may indicate a higher likelihood that the user 102 is a liver person. The shadow analyzer 118 may compare additional video frames and store additional scores in the shadow scores 120. The presence of shadows may indicate that the image of the user 102 is that of a three dimensional face instead of a two dimensional face on paper.

The liveness detector 124 compares the shadows scores 120 to the shadow score thresholds 122. In some implementations, the liveness detector 124 averages the shadow scores 120. If the shadow scores 120 satisfy the shadow score thresholds 122, then the liveness detector 124 determines that the user 102 is a live person. For example, if the average of the shadows scores 120 is 0.85 and the shadow score threshold 122 is 0.80, then the liveness detector 124 determines that the user 102 is a live person. If the shadow scores 120 does not satisfy the shadow score thresholds 122, then the liveness detector 124 determines that the user 102 is not a live person. For example, if the average of the shadows scores 120 is 0.40 and the shadow score threshold 122 is 0.80, then the liveness detector 124 determines that the user 102 is not a live person. In some implementations, different applications may use different thresholds. For example, a passport renewal application may use a threshold of 0.95, and a shopping club card renewal application may use a threshold of 0.80. If the liveness detector 124 determines that the user 102 is a live person, then the application continues to execute. If the liveness detector 124 determines that the user 102 is a live person, then the application generates an error.

Figure 2:
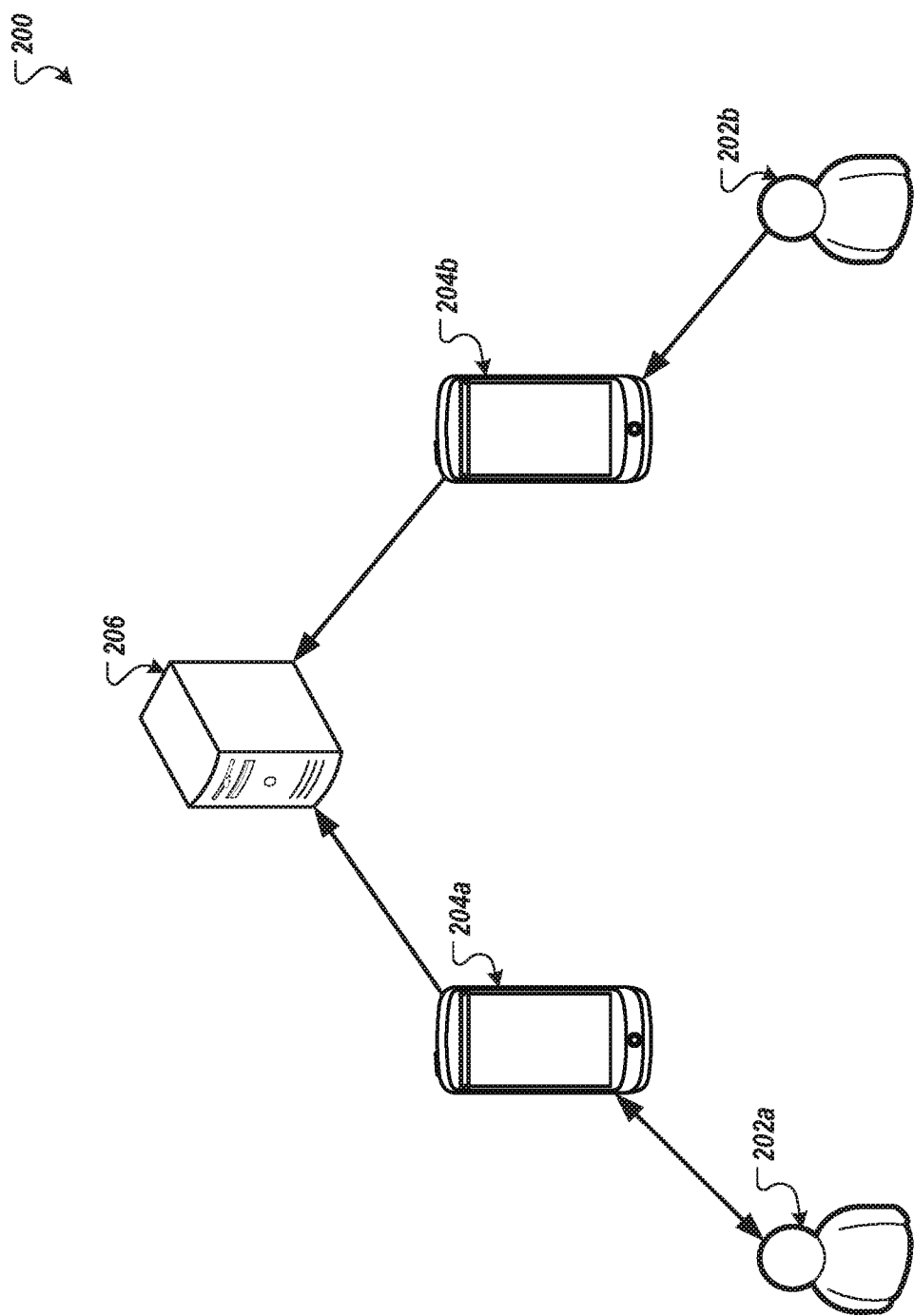
FIG. 2 is a diagram showing a hierarchical example for handling user authentication from the mobile devices of the user.

FIG. 2 is a diagram showing an example of a hierarchy for handling user authentication from the mobile devices of the user. Users 202A and 202B may each have mobile devices 204A and 204B respectively. Here, the mobile devices 204A and 204B may be registered to users 202A and 202B, respectively. Example mobile devices 204A and 104B may include smartphones, tablets, laptops, etc. Mobile devices 104A and 104B may include lighting components or accessories, such as flashing lights. The lights may include light emission diode (LED) devices. Mobile devices 204A and 204B may further seek to communicate with server 206 to authenticate user requests submitted from mobile devices 204A and 204B.

Here, instead of patronizing a post office to renew a passport (or going to a department of mobile vehicle's office to renew a driver's license), a user may choose to renew an identification document, such as a passport or a driver's license remotely. In one instance, when mobile devices 204A and 204B include smartphone devices, an app installed on the smartphone device may guide the user through an on-line renewal process. In this instance, the app may ask the user to submit a recent photo and may invoke a camera device on the smartphone to take a facial portrait of the user. The remote nature of this operation raises the concern of fraudulent submission in the context of identity management. For illustration, the photo submitted can be a facial portrait of a different person and for the sole purpose of stealing the identity of the original person. The photo submitted could also be from a stolen ID for the sole purpose of perpetuating a fake ID. Because the photo could generally include an image sequence, an intruder may also attempt a spoofing attacking by replaying an existing sequence of image frames. Some implementations disclosed herein may mitigate such risks.

To counter such risks inherent with remote operations, the mobile app may leverage a video sequence taken from the camera device by analyzing image frames from the video sequence to determine that the video sequence is part of a live session and is not a static image or static image sequence, for example, from a static replay attack.

In this example, the analysis of the video frame may be performed at the smartphone device to determine the three-dimensional facial features taken from a live session. Once the analysis confirmed the liveness of the video sequence, the facial portrait taken in association with the video sequence may be submitted to server 206 for registration and renewal of the identification document. If the registration is successful, server 206 may issue a renewed identification document. For example, server 206 may cause a renewal copy to be mailed to the user. Server 206 may also arrange to have a renewed digital identification document to be installed on user device. Notably, in some implementations, analyzing the video frame may be performed at the server.

Figure 3:
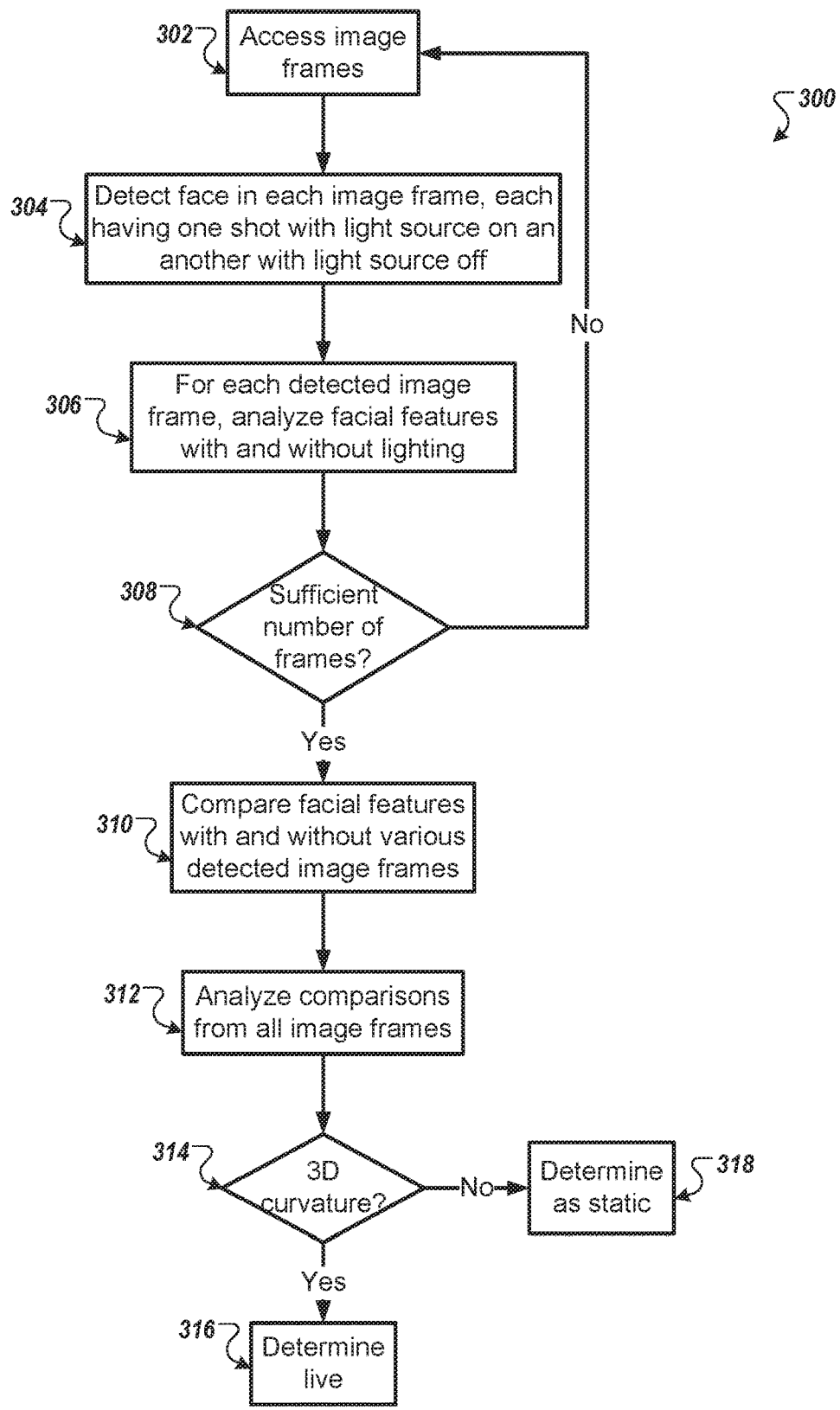
FIG. 3 is a flow chart for an example of verifying liveness of a user authentication request from a mobile device.
Figure 4A:
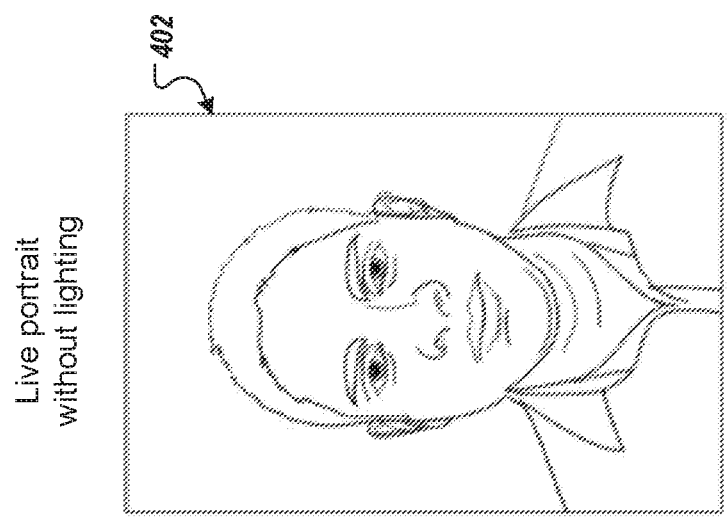
Figure 4B:
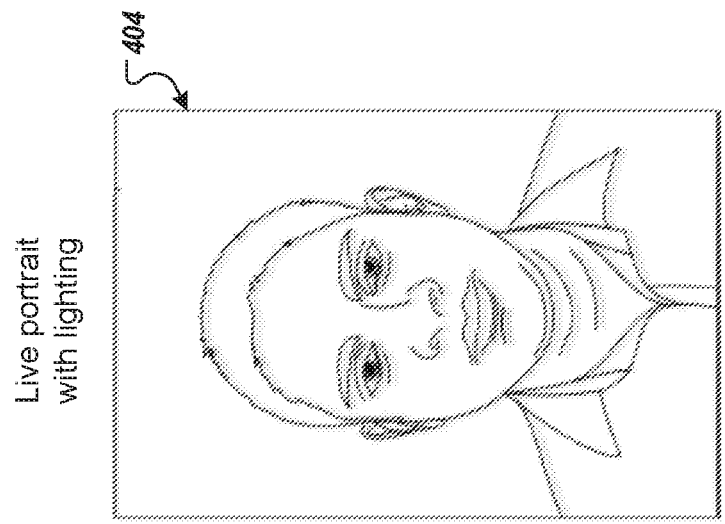

FIG. 3 is a flow chart 300 for an example of verifying liveness of a user authentication request from a mobile device. In this example, the mobile device may initially engage an on-board camera device to obtain a video sequence, for example, as part of a scout scan during a selfie photo session. This shoot out session may be synchronized with the activation of lighting components or accessories such that image frames are taken with varying lighting patterns (e.g., some with lighting while others are not). The mobile device may first access the image frames (302) by extracting individual frames from the video sequence. Here, the video sequence may be from a video stream (for example, as determined by Nation Television System Committee-NTSC, or as determined by the video communication standard H.261). In some implementations, for efficiency of communication, only a portion of the captured video stream may be transmitted, for example, to server 206 and in accordance with adaptive video codec specification of H.261. The extraction may lead to detection of face in each image frame and many facial landmark features (e.g., 63 facial landmark features) in each face (304). In one implementation, each image frame is taken twice, once with light source on and the other with light source off. For each extracted image frame, a variety of facial landmarks may be detected and each detected facial landmark with and without lighting may be analyzed (306). Subsequently, a determination is made as to whether sufficient image frames have been obtained (308). The determination may be rendered in view of the frame rate of the video sequence. If the number of image frames are insufficient, more image frames from the video sequence may be obtained. If the number of image frames from the video sequence are enough, the detected facial landmarks in each image frame with light source on and light source off may be compared (310). The comparison may include grouping the same facial landmark features from various detected image frames. The classified facial landmarks from the various detected image frames with or without lighting may be compared (312).

The comparison from the various image frames may yield useful insight about the three-dimensional nature and liveness of these features. For example, if there is a real "live" subject in the camera's field of view, then lighting pattern differences can be detected on the surface of the skin—i.e. on the tip of nose, in the eyes, on the cheeks, tip of chins, highlights may become accentuated, shadows may lighten, etc. When compared to an image captured under neutral lighting that may not create shadows (e.g., at a particular illuminating angle), these differences are plain to detect, and hence a determination of "liveness" can be made. Neutral lighting means the image frame is acquired without the known lighting source turned on, for example, the front flash light is not being used. On the other hand, if there is a static "picture" or video in the camera's field of view, then lighting changes will not create the same types of changes on the skin. Lighting changes will be manifested as reflected "bright spots" or "hot spots" on the surface of the paper (or video screen), which would then be recorded.

Some implementations may additionally search for reflections in "the background." When a selfie is taken, a reflection may be present in the field of view, but off the face. In addition to comparing lighting changes on the face, these spots could be noted and compared to other images captured in the sequence to ensure that the relative location of those reflections are also not exactly identical, as a secondary form of liveness check using the same user experience.

A number of factors may be analyzed and the results combined when determining whether an object is a three-dimensional live object. Referring to FIGS. 4A-4D, examples of verifying liveliness are illustrated when authenticating a facial biometric as submitted by a user from a mobile device. Here, the facial portraits 402 to 406 illustrate either live or static portrait under lighting or without lighting. These representative facial portraits may be derived from a scanning sequence in which a number of shots of the subject's face are taken from varying angles on the same scanning path, for example, during a selfie session using a mobile device, such as an iPhone. In these examples, the facial portraits from a live session reflect the face of the subject at various angles on this arc or line segment. Due to slight changes in illumination angles of various facial features from the facial portrait (e.g., the forehead, the eye brows, the eyes, the eye corners, the lips, and the mouths), the appearance of shadows may vary. Due to changes in lighting patterns, each landmark feature may be associated with one commensurate changes in shadow appearance. As illustrated, facial portraits 402 is taken without lighting while facial portrait 404 is taken with lighting on. The shadow appearance in facial portrait 404 are characteristic of a three-dimensional structure. Such shadow appearance may also indicate the angle of illumination. To deter spoofing, the angle of illumination can be effectuated in a random fashion between the image frames. Additionally, the frequency or on-off pattern of the illumination can also be randomized to create flickering or ambient illumination pattern. In this manner, simply introducing a video of an existing image sequence would be insufficient for authentication, as the angle of illumination in an earlier image sequence would not be the same as the current selfie session. The effectiveness of the technique can be further appreciated by comparing and contrasting facial portraits 402 and 404 with facial portraits 406 and 408.

In more detail, several observation points can be placed on each landmark feature on the facial portrait automatically. The automatic placement process can include automatically distributing the points on a segmented landmark. The distribution can be the result of operator-led training. For example, the distribution may be the result of an artificial intelligence program learning from placement results drawn by human operators. The distribution can also be the result of optimizing heuristics of placement, for example, the degree of even spacing, the need to place more points on more curvy segments. While these observations points may be readily available at various viewing angles, their collective geometrical configuration can be used to estimate an orientation or shape factor of the landmark. In other words, the orientation and shape factor for the five observation points within each landmark segment can be determined for each image frame of an image sequence. Because each image frame is presumably taken from slightly different angles, the measured orientation and shape factors of each landmark are expect to vary. The differentiation may also include illumination variations among the positions. Within each position, the lighting pattern for each constituent point may also be different, leading to different shadow appearances. If such differentiations are indeed observed, then the image sequence is more likely taken from a 3D object, rather than a 2D static image.

As expected, there will be individual variations. Some people may have a more flat tempo. Some may have more rounded tempo or a more distinct silhouette. Therefore, relying on one landmark, such as the eyebrow, may not be sufficient even when both lateral sides are included. Indeed, some implementations factor in various landmarks. As such, implementations may factor in observation points for multiple landmark features, include an eye brow, an eyelid, a nose ridge, a lateral nostril, a lip, a chin area, or a facial contour. The metrics of each landmark can be measured individually, including the shadow resulting from an illumination angle. The measured metrics for each landmark can be compared across the various image frames to determine if the variation is more than a threshold amount. As there are more than one landmarks, comparison of metrics from the landmarks can be viewed as a whole against a combined threshold. In some instances, comparison results from various landmarks can be weighed so that the contribution from each landmark feature is analyzed in view of other landmark features. In this manner, no landmark feature may be determinative so that even if one particular landmark feature may render inoperative analytic results, the determination can be performed by viewing other landmark features. In these instances, the weight accorded to each landmark feature can be adaptively determined beforehand, for example, through a machine learning algorithm.

The threshold of expected change may be a combination of all expected changes for the landmark features. Returning to FIG. 3, the combined score may be compared with a threshold level (314) to determine whether the facial portrait is a 3-D live object (316, 318). As noted above, the threshold may be application-specific. For example, for transaction involving dollar amounts under a particular level, the comparison may be less sophisticated in order to determine that the session is live and the submitted facial biometric is genuine. Otherwise, when the transaction involves a paramount identification document, for example, renewal of passport, the comparison may involve a more comprehensively determined threshold.

Due to lack of automated liveness detection technologies, most of the enrollment processes are performed in front a human operator. This presence of a human operator generally requires a trained operator to run the system and the user to travel to the specific place. The process can be time consuming and costly. An automated process, especially one such process run remotely, may suffer from lack of liveness detection. This absence of liveness detection can give rise to access by an unauthorized party to a secured system when spoofing images or videos are used. Some anti-spoofing techniques may be capable of detecting motion within a camera's fiend of view to address the notion of "taking a picture of a picture." Yet, the attack vector may have evolved to include "taking a picture of a video," given the ease of introducing video to consumers using mobile devices such as tablets. Disclosures herein may not only involve performing 3-D extrapolation (e.g., issuing user directive to make gesture moves or analyzing 3-D features of facial landmarks), but can also mitigate risks of "taking a picture of a video" by employing variations in lighting patterns to inject another dimension of robustness for liveness determination. These detection methods can provide a measure for the liveness confidence level to indicate whether the photo is taken directly from a live person or from a still image (or video) displayed on, for example, a computer screen. Such methods can enhance the security of identify related applications, such as remote renewal of identification document, remote login using facial biometric data, remote access to financial account using facial biometric. The enhancement can manifest as reduced risk of altered or spoofed images and hence image related identity fraud. Some implementations disclosed herein can detected liveness seamlessly and without user awareness (e.g., directing the user to make any specific moves during the image capturing process). The stealth feature can be leveraged to further isolate liveness detection from an on-line identity management session. Indeed, implementations disclosed herein may be modular as a stand-alone add-on or integrated in a liveness package.

Figure 5:
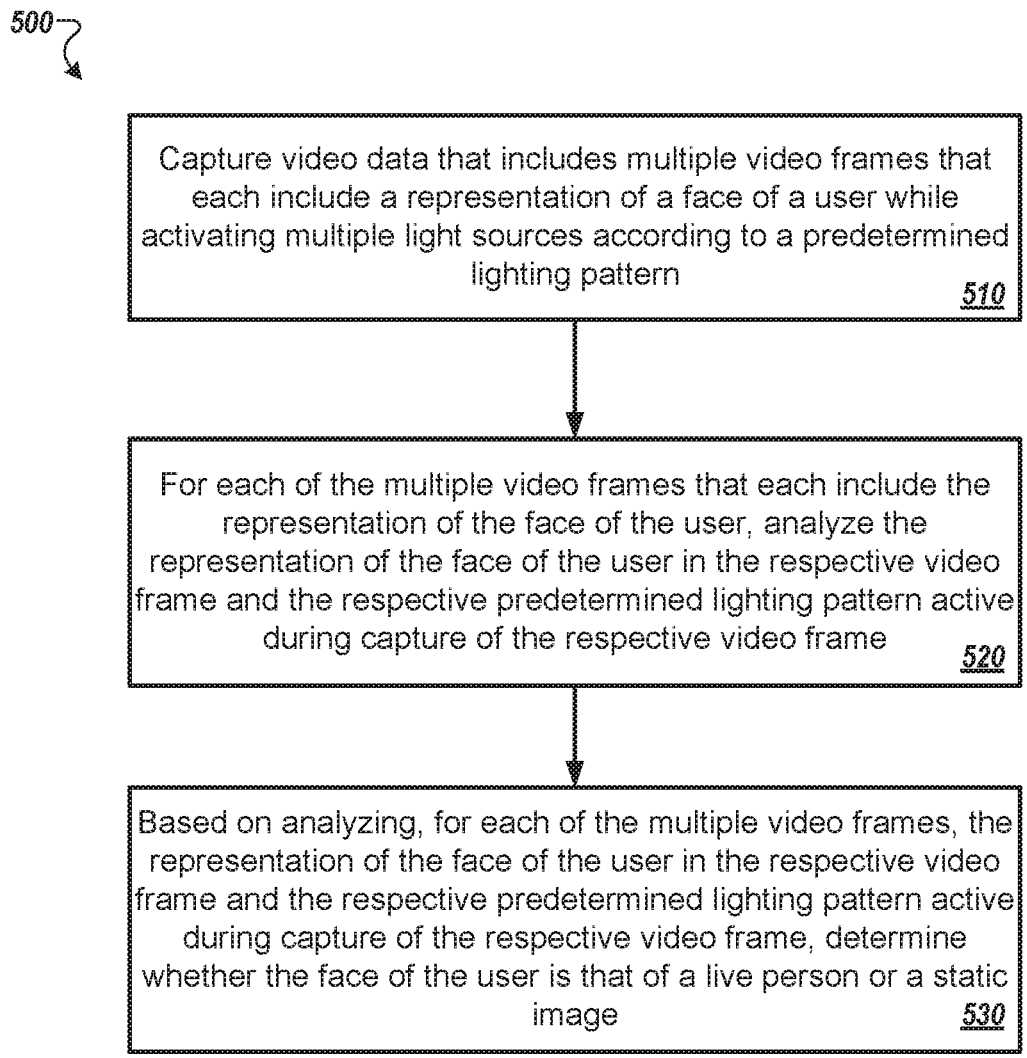
FIG. 5 is a flowchart of an example process for determining liveness.

FIG. 5 is a flowchart of an example process 500 for determining whether an image includes a representation of a live person. In general, the process 500 varies the illumination pattern of the subject of an image while capturing a video of the subject. The process 500 analyzes the frames of the video for changes in the shadows on the face of the subject. Based on the changes in the shadows on the face of the subject, the process 500 determines whether the subject of the image is a live person or a static image of a person. The process 500 will be described as being performed by a computer system comprising one or more computers, for example, the system 100 of FIG. 1 or system 200 of FIG. 2. Each of the components of either system 100 or system 200 may be included on a single computing device or distributed across multiple computing devices.

The system captures video data that includes multiple video frames that each include a representation of a face of a user while activating multiple light sources according to a predetermined lighting pattern (510). In some implementations, the system captures each video frame while a different lighting pattern illuminates the user. In some implementations, the system captures a video frame with the multiple light sources off. In some implementations, the system is a mobile phone with a front facing camera and multiple LEDs.

The system, for each of the multiple video frames that each include the representation of the face of the user, analyzes the representation of the face of the user in the respective video frame and the respective predetermined lighting pattern active during capture of the respective video frame (520). In some implementations, the system analyzes the representation of the face of the user for shadow patterns. The system compares the shadow patterns on the representation of the face of the user to the video frames with the multiple light sources off. The system determine whether the video frames with the multiple light sources on include shadows that the video frames with the multiple light sources off do not include.

The system, based on analyzing, for each of the multiple video frames, the representation of the face of the user in the respective video frame and the respective predetermined lighting pattern active during capture of the respective video frame, determines whether the face of the user is that of a live person or a static image (530). If the system determines that the illuminated video frames include shadows that the unilluminated video frames do not include, then the system determines that the user is a live person. If the system determines that the illuminated video frames do not include shadows that the unilluminated video frames do not include, then the system determines that the user is not a live person. If the system in unable to reach a conclusive determination, then the system may capture an additional set of video frames with a different illumination pattern and perform the process 300 again.

Figure 6:
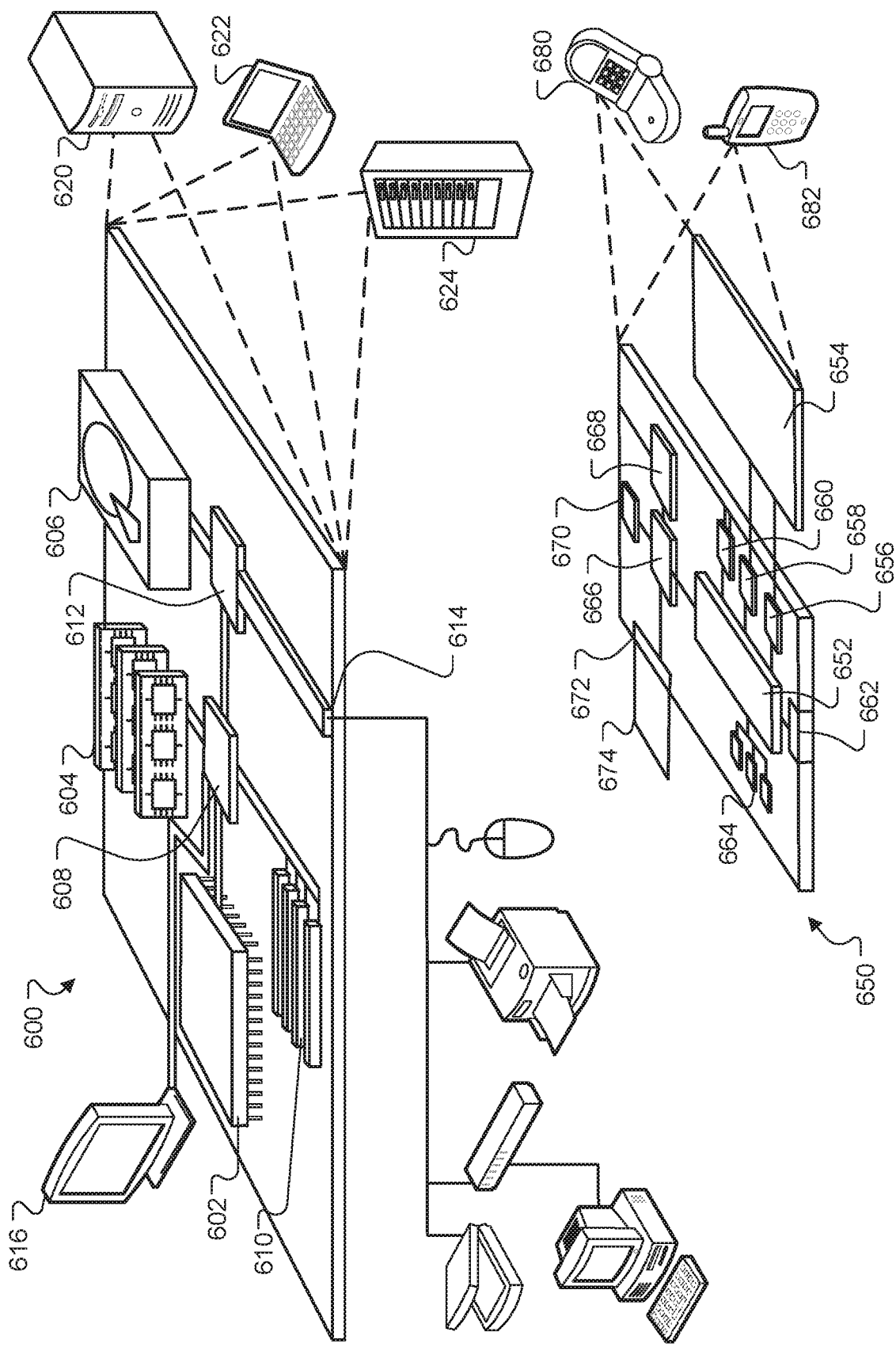
FIG. 6 is an example of a computing device and a mobile computing device.

FIG. 6 shows an example of a computing device 600 and a mobile computing device 650 that can be used to implement the techniques described here. The computing device 600 is intended to represent various forms of digital computers, such as laptops, desktops, workstations, personal digital assistants, servers, blade servers, mainframes, and other appropriate computers. The mobile computing device 650 is intended to represent various forms of mobile devices, such as personal digital assistants, cellular telephones, smart-phones, and other similar computing devices. The components shown here, their connections and relationships, and their functions, are meant to be examples only, and are not meant to be limiting.

The computing device 600 includes a processor 602, a memory 604, a storage device 606, a high-speed interface 608 connecting to the memory 604 and multiple high-speed expansion ports 610, and a low-speed interface 612 connecting to a low-speed expansion port 614 and the storage device 606. Each of the processor 602, the memory 604, the storage device 606, the high-speed interface 608, the high-speed expansion ports 610, and the low-speed interface 612, are interconnected using various busses, and may be mounted on a common motherboard or in other manners as appropriate. The processor 602 can process instructions for execution within the computing device 600, including instructions stored in the memory 604 or on the storage device 606 to display graphical information for a GUI on an external input/output device, such as a display 616 coupled to the high-speed interface 608. In other implementations, multiple processors and/or multiple buses may be used, as appropriate, along with multiple memories and types of memory. Also, multiple computing devices may be connected, with each device providing portions of the necessary operations (e.g., as a server bank, a group of blade servers, or a multi-processor system).

The memory 604 stores information within the computing device 600. In some implementations, the memory 604 is a volatile memory unit or units. In some implementations, the memory 604 is a non-volatile memory unit or units. The memory 604 may also be another form of computer-readable medium, such as a magnetic or optical disk.

The storage device 606 is capable of providing mass storage for the computing device 600. In some implementations, the storage device 606 may be or contain a computer-readable medium, such as a floppy disk device, a hard disk device, an optical disk device, or a tape device, a flash memory or other similar solid state memory device, or an array of devices, including devices in a storage area network or other configurations. Instructions can be stored in an information carrier. The instructions, when executed by one or more processing devices (for example, processor 602), perform one or more methods, such as those described above. The instructions can also be stored by one or more storage devices such as computer- or machine-readable mediums (for example, the memory 604, the storage device 606, or memory on the processor 602).

The high-speed interface 608 manages bandwidth-intensive operations for the computing device 600, while the low-speed interface 612 manages lower bandwidth-intensive operations. Such allocation of functions is an example only. In some implementations, the high-speed interface 608 is coupled to the memory 604, the display 616 (e.g., through a graphics processor or accelerator), and to the high-speed expansion ports 610, which may accept various expansion cards (not shown). In the implementation, the low-speed interface 612 is coupled to the storage device 606 and the low-speed expansion port 614. The low-speed expansion port 614, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 600 may be implemented in a number of different forms, as shown in the figure. For example, it may be implemented as a standard server 620, or multiple times in a group of such servers. In addition, it may be implemented in a personal computer such as a laptop computer 622. It may also be implemented as part of a rack server system 624. Alternatively, components from the computing device 600 may be combined with other components in a mobile device (not shown), such as a mobile computing device 650. Each of such devices may contain one or more of the computing device 600 and the mobile computing device 650, and an entire system may be made up of multiple computing devices communicating with each other.

The mobile computing device 650 includes a processor 652, a memory 664, an input/output device such as a display 654, a communication interface 666, and a transceiver 668, among other components. The mobile computing device 650 may also be provided with a storage device, such as a micro-drive or other device, to provide additional storage. Each of the processor 652, the memory 664, the display 654, the communication interface 666, and the transceiver 668, are interconnected using various buses, and several of the components may be mounted on a common motherboard or in other manners as appropriate.

The processor 652 can execute instructions within the mobile computing device 650, including instructions stored in the memory 664. The processor 652 may be implemented as a chipset of chips that include separate and multiple analog and digital processors. The processor 652 may provide, for example, for coordination of the other components of the mobile computing device 650, such as control of user interfaces, applications run by the mobile computing device 650, and wireless communication by the mobile computing device 650.

The processor 652 may communicate with a user through a control interface 658 and a display interface 656 coupled to the display 654. The display 654 may be, for example, a TFT (Thin-Film-Transistor Liquid Crystal Display) display or an OLED (Organic Light Emitting Diode) display, or other appropriate display technology. The display interface 656 may comprise appropriate circuitry for driving the display 654 to present graphical and other information to a user. The control interface 658 may receive commands from a user and convert them for submission to the processor 652. In addition, an external interface 662 may provide communication with the processor 652, so as to enable near area communication of the mobile computing device 650 with other devices. The external interface 662 may provide, for example, for wired communication in some implementations, or for wireless communication in other implementations, and multiple interfaces may also be used.

The memory 664 stores information within the mobile computing device 650. The memory 664 can be implemented as one or more of a computer-readable medium or media, a volatile memory unit or units, or a non-volatile memory unit or units. An expansion memory 674 may also be provided and connected to the mobile computing device 650 through an expansion interface 672, which may include, for example, a SIMM (Single In Line Memory Module) card interface. The expansion memory 674 may provide extra storage space for the mobile computing device 650, or may also store applications or other information for the mobile computing device 650. Specifically, the expansion memory 674 may include instructions to carry out or supplement the processes described above, and may include secure information also. Thus, for example, the expansion memory 674 may be provide as a security module for the mobile computing device 650, and may be programmed with instructions that permit secure use of the mobile computing device 650. In addition, secure applications may be provided via the SIMM cards, along with additional information, such as placing identifying information on the SIMM card in a non-hackable manner.

The memory may include, for example, flash memory and/or NVRAM memory (non-volatile random access memory), as discussed below. In some implementations, instructions are stored in an information carrier. that the instructions, when executed by one or more processing devices (for example, processor 652), perform one or more methods, such as those described above. The instructions can also be stored by one or more storage devices, such as one or more computer- or machine-readable mediums (for example, the memory 664, the expansion memory 674, or memory on the processor 652). In some implementations, the instructions can be received in a propagated signal, for example, over the transceiver 668 or the external interface 662.

The mobile computing device 650 may communicate wirelessly through the communication interface 666, which may include digital signal processing circuitry where necessary. The communication interface 666 may provide for communications under various modes or protocols, such as GSM voice calls (Global System for Mobile communications), SMS (Short Message Service), EMS (Enhanced Messaging Service), or MMS messaging (Multimedia Messaging Service), CDMA (code division multiple access), TDMA (time division multiple access), PDC (Personal Digital Cellular), WCDMA (Wideband Code Division Multiple Access), CDMA2000, or GPRS (General Packet Radio Service), among others. Such communication may occur, for example, through the transceiver 668 using a radio-frequency. In addition, short-range communication may occur, such as using a Bluetooth, WiFi, or other such transceiver (not shown). In addition, a GPS (Global Positioning System) receiver module 670 may provide additional navigation- and location-related wireless data to the mobile computing device 650, which may be used as appropriate by applications running on the mobile computing device 650.

The mobile computing device 650 may also communicate audibly using an audio codec 660, which may receive spoken information from a user and convert it to usable digital information. The audio codec 660 may likewise generate audible sound for a user, such as through a speaker, e.g., in a handset of the mobile computing device 650. Such sound may include sound from voice telephone calls, may include recorded sound (e.g., voice messages, music files, etc.) and may also include sound generated by applications operating on the mobile computing device 650.

The mobile computing device 650 may be implemented in a number of different forms, as shown in the figure. For example, it may be implemented as a cellular telephone 680. It may also be implemented as part of a smart-phone 682, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms machine-readable medium and computer-readable medium refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term machine-readable signal refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network (LAN), a wide area network (WAN), and the Internet.

The computing system can include clients and servers. A client and server are generally remote from each other and typically interact through a communication network. The relationship of client and server arises by virtue of computer programs running on the respective computers and having a client-server relationship to each other.

Although a few implementations have been described in detail above, other modifications are possible. For example, while a client application is described as accessing the delegate(s), in other implementations the delegate(s) may be employed by other applications implemented by one or more processors, such as an application executing on one or more servers. In addition, the logic flows depicted in the figures do not require the particular order shown, or sequential order, to achieve desirable results. In addition, other actions may be provided, or actions may be eliminated, from the described flows, and other components may be added to, or removed from, the described systems. Accordingly, other implementations are within the scope of the following claims.

What is claimed is:

1. A computer-implemented method comprising:
  capturing, by a computing device, video data that includes multiple video frames that each include a representation of a face of a user while activating multiple light sources according to a predetermined lighting pattern;
  for each of the multiple video frames that each include the representation of the face of the user, analyzing, by the computing device, the representation of the face of the user in the respective video frame and the respective predetermined lighting pattern active during capture of the respective video frame, wherein analyzing the representation of the face of the user in the respective video frame and the respective predetermined lighting pattern active during capture of the respective video frame comprises analyzing shadow patterns on each of the respective video frames; and
  based on analyzing, for each of the multiple video frames, the representation of the face of the user in the respective video frame and the respective predetermined lighting pattern active during capture of the respective video frame, determining, by the computing device, whether the face of the user is that of a live person or a static image, wherein determining whether the face of the user is that of a live person or a static image is based on the shadow patterns on each of the respective video frames.

2. The method of claim 1, comprising:
based on analyzing shadow patterns on each of the respective video frames, determining that the representation of the face of the user includes shadow patterns that indicate three-dimensional facial features on the representation of the face of the user,
wherein determining whether the face of the user is that of a live person or a static image comprises determining that the face of the user is that of a live person based on determining that the representation of the face of the user includes shadow patterns that indicate three-dimensional facial features on the representation of the face of the user.

3. The method of claim 1, comprising:
based on analyzing shadow patterns on each of the respective video frames, determining that the representation of the face of the user includes shadow patterns that indicate two-dimensional facial features on the representation of the face of the user,
wherein determining whether the face of the user is that of a live person or a static image comprises determining that the face of the user is that of a static image based on determining that the representation of the face of the user includes shadow patterns that indicate two-dimensional facial features on the representation of the face of the user.

4. The method of claim 1, wherein:
the computing device is a mobile phone,
the video data is captured by a front facing camera of the mobile phone, and
the multiple light sources include multiple LEDs of the mobile phone.

5. The method of claim 1, wherein:
determining whether the face of the user is that of a live person or a static image is inconclusive, and
the method comprises:
based on determining whether the face of the user is that of a live person or a static image is inconclusive, capturing, by the computing device, additional video data while activating the multiple light sources according to a different lighting pattern.

6. The method of claim 1, wherein the predetermined lighting pattern comprises a period of time when each of the multiple light sources are off.

7. The method of claim 1 wherein analyzing, by the computing device, the representation of the face of the user includes analyzing based on a portion of the captured video.

8. A system comprising:
one or more computers; and
one or more storage devices storing instructions that are operable, when executed by the one or more computers, to cause the one or more computers to perform operations comprising:
capturing, by a computing device, video data that includes multiple video frames that each include a representation of a face of a user while activating multiple light sources according to a predetermined lighting pattern;
for each of the multiple video frames that each include the representation of the face of the user, analyzing, by the computing device, the representation of the face of the user in the respective video frame and the respective predetermined lighting pattern active during capture of the respective video frame wherein analyzing the representation of the face of the user in the respective video frame and the respective predetermined lighting pattern active during capture of the respective video frame comprises analyzing shadow patterns on each of the respective video frames; and
based on analyzing, for each of the multiple video frames, the representation of the face of the user in the respective video frame and the respective predetermined lighting pattern active during capture of the respective video frame, determining, by the computing device, whether the face of the user is that of a live person or a static image, wherein determining whether the face of the user is that of a live person or a static image is based on the shadow patterns on each of the respective video frames.

9. The system of claim 8, wherein the operations comprise:
based on analyzing shadow patterns on each of the respective video frames, determining that the representation of the face of the user includes shadow patterns that indicate three-dimensional facial features on the representation of the face of the user,
wherein determining whether the face of the user is that of a live person or a static image comprises determining that the face of the user is that of a live person based on determining that the representation of the face of the user includes shadow patterns that indicate three-dimensional facial features on the representation of the face of the user.

10. The system of claim 8, wherein the operations comprise:
based on analyzing shadow patterns on each of the respective video frames, determining that the representation of the face of the user includes shadow patterns that indicate two-dimensional facial features on the representation of the face of the user,
wherein determining whether the face of the user is that of a live person or a static image comprises determining that the face of the user is that of a static image based on determining that the representation of the face of the user includes shadow patterns that indicate two-dimensional facial features on the representation of the face of the user.

11. The system of claim 8, wherein:
the computing device is a mobile phone,
the video data is captured by a front facing camera of the mobile phone, and
the multiple light sources include multiple LEDs of the mobile phone.

12. The system of claim 8, wherein:
determining whether the face of the user is that of a live person or a static image is inconclusive, and
the method comprises:
based on determining whether the face of the user is that of a live person or a static image is inconclusive, capturing, by the computing device, additional video data while activating the multiple light sources according to a different lighting pattern.

13. The system of claim 8, wherein the predetermined lighting pattern comprises a period of time when each of the multiple light sources are off.

14. The system of claim 8 wherein analyzing, by the computing device, the representation of the face of the user includes analyzing based on a portion of the captured video.

15. A non-transitory computer-readable medium storing software comprising instructions executable by one or more computers which, upon such execution, cause the one or more computers to perform operations comprising:

capturing, by a computing device, video data that includes multiple video frames that each include a representation of a face of a user while activating multiple light sources according to a predetermined lighting pattern;

for each of the multiple video frames that each include the representation of the face of the user, analyzing, by the computing device, the representation of the face of the user in the respective video frame and the respective predetermined lighting pattern active during capture of the respective video frame, wherein analyzing the representation of the face of the user in the respective video frame and the respective predetermined lighting pattern active during capture of the respective video frame comprises analyzing shadow patterns on each of the respective video frames; and based on analyzing, for each of the multiple video frames, the representation of the face of the user in the respective video frame and the respective predetermined lighting pattern active during capture of the respective video frame, determining, by the computing device, whether the face of the user is that of a live person or a static image, wherein determining whether the face of the user is that of a live person or a static image is based on the shadow patterns on each of the respective video frames.

16. The medium of claim 15, wherein the operations comprise:

based on analyzing shadow patterns on each of the respective video frames, determining that the representation of the face of the user includes shadow patterns that indicate three-dimensional facial features on the representation of the face of the user, wherein determining whether the face of the user is that of a live person or a static image comprises determining that the face of the user is that of a live person based on determining that the representation of the face of the user includes shadow patterns that indicate three-dimensional facial features on the representation of the face of the user.

17. The medium of claim 15, wherein the operations comprise:

based on analyzing shadow patterns on each of the respective video frames, determining that the representation of the face of the user includes shadow patterns that indicate two-dimensional facial features on the representation of the face of the user, wherein determining whether the face of the user is that of a live person or a static image comprises determining that the face of the user is that of a static image based on determining that the representation of the face of the user includes shadow patterns that indicate two-dimensional facial features on the representation of the face of the user.

18. The medium of claim 15, wherein:

the computing device is a mobile phone, the video data is captured by a front facing camera of the mobile phone, and the multiple light sources include multiple LEDs of the mobile phone.

19. The medium of claim 15, wherein:

determining whether the face of the user is that of a live person or a static image is inconclusive, and the method comprises:

based on determining whether the face of the user is that of a live person or a static image is inconclusive, capturing, by the computing device, additional video data while activating the multiple light sources according to a different lighting pattern.

20. The medium of claim 15 analyzing, by the computing device, the representation of the face of the user includes analyzing based on a portion of the captured video.

\* \* \* \* \*